United States Patent
Rogers

[11] 4,178,075
[45] Dec. 11, 1979

[54] LENSES WITH DISTORTION
[75] Inventor: Philip J. Rogers, Clwyd, Wales
[73] Assignee: Pilkington P. E. Limited, St. Helens, England
[21] Appl. No.: 874,311
[22] Filed: Feb. 1, 1978
[30] Foreign Application Priority Data
Feb. 10, 1977 [GB] United Kingdom ............... 5649/77
[51] Int. Cl.² ............................. G02B 9/60; G02B 9/62
[52] U.S. Cl. ............................... 350/175 FS; 350/214; 350/215
[58] Field of Search ................. 350/214, 215, 175 FS
[56] References Cited
U.S. PATENT DOCUMENTS

| 3,446,547 | 5/1969 | Jeffree | 350/215 |
| 3,517,985 | 6/1970 | Ruben | 350/215 |
| 3,868,173 | 2/1975 | Miles et al. | 350/215 |

FOREIGN PATENT DOCUMENTS 1358101  5/1963  France ....................................... 350/215

OTHER PUBLICATIONS

Becker, J., "Optical Systems for Use at Low Light Levels," Optica Acta vol. 17, No. 7, pp. 481-496, 1970.

Primary Examiner—Conrad J. Clark
Attorney, Agent, or Firm—Mattern, Ware, Davis & Stoltz

[57] ABSTRACT

An objective lens particularly for use in a low light level or night vision system designed to introduce a controlled amount of barrel distortion at the edges of its field of view to permit use with a flat input faced imaging tube.

20 Claims, 4 Drawing Figures

LENSES WITH DISTORTION

BACKGROUND OF THE INVENTION

This invention concerns improvements in or relating to lenses.

Relatively high aperture objective lenses of moderately wide field of view are often required for use in low light level systems such as night vision sights or low light television systems. The dual requirement of relatively high aperture and at least moderately wide field of view has led to the use of a curved, generally concave, fibre-optic plate on the input face of the imaging tube in a low light level system in order to reduce the technical problems in the lens design. This can, however, cause problems due to the lack of versatility of a tube designed to work with one particular objective lens only. It is, therefore highly desirable that relatively high aperture and at least moderately wide angle objective lenses should be designed which can work in conjunction with flat input faced tubes.

Some image intensifier tubes used in night vision sights suffer from high levels of electronically induced distortion, thus giving a heavily pincushion distorted picture at the output of the tube. Where a relatively linear picture is required of the night sight, the objective lens used in association with the tube needs to produce a high level of barrel distortion to counteract the pincushion distortion of the tube. This, even if possible, tends to result in severe off-axis aberration being given by the objective lens due to the high incidence angles of the principal ray that are necessary at some lens surfaces to produce the required level of image distortion. Further, even in cases where the intensifier tube or television camera introduces no image distortion, it is often desirable that the objective lens should introduce a little barrel distortion to counteract the inherent pincushion distortion of viewing devices such as magnifiers used to view the picture given by the tube.

SUMMARY

According to the present invention there is provided an objective lens which introduces barrel distortion at the edges of its field of view, the lens comprising a front part of positive power consisting of at least one positive lens element, a middle part of negative power consisting of at least two lens elements, one of which is of negative power and of a dispersive material and the other of which is of positive power but less powerful and of a less dispersive material than the negative power element, a back part of positive power and consisting of at least two components of positive power and with front convex surfaces, at least one of the components being a doublet which corrects residual lateral chromatic aberration, and a field-flattening element of negative power, wherein the middle part of negative power corrects residual spherical aberration of the front and back positive parts and lowers the residual Petzval sum which is further reduced by the negative field-flattening element, and wherein the front convex surfaces of the components of the back part of positive power contribute to barrel distortion.

A lens in accordance with the invention may have relatively high aperture, for example in the range F/0.8 to F/1.42, and a moderately wide field of view, for example in the range of 40 to 50 degrees, and may have a level of barrel distortion for example in the range 3% to 26% at the edges of its field of view.

The front part of the lens may consist of a single positive lens element when a very high aperture is not required. Where a very high aperture (e.g. of about F/1.0 or higher) is required, the front part of the lens may consist of a plurality of elements, for example three elements, and may include a doublet having a positive element with a refractive index at least as high as that of a negative element to which it is cemented.

The middle negative part of the lens may consist of a powerful negative element made of a dispersive flint glass type and a weaker positive element made of a less dispersive crown glass type. The negative and positive elements of the middle part of the lens may be cemented together to form a doublet, or may be spaced elements.

The level of barrel distortion introduced by the back positive part of the lens may be determined by the curvature of the front convex surfaces of the components forming the back part. Thus where a high level of barrel distortion is required, these components may be shaped to present strongly curved convex surfaces towards the front of the lens, so that there are high principal ray incidence angles at these surfaces which, in conjunction with the normal position of the aperture stop in the vicinity of the middle part of the lens, give strong barrel distortion contributions. Hence at least one of these front convex surfaces may have a radius of curvature less than the focal length of the complete lens. However, when very high levels of barrel distortion, e.g. in excess of about 20%, are required, the shape required of the positive lens components in the back part of the lens may be too extreme to enable other aberrations to be well corrected. Alternatively or additionally, therefore, high principal ray incidence angles at the front convex surfaces of the back part components can be achieved by increasing the spacing between the middle and back parts of the lens. Thus a relatively large air gap between the middle part of the lens and the back part of the lens may be provided, which air gap may be of the largest air gap in the lens and may for example be about three quarters of the focal length of the complete lens.

The focal length of the front part of the lens may be in the range $+1.4F$ to $+2.3F$; the focal length of the middle part of the lens may be in the range of $-1.4F$ to $-8F$; the focal length of the back part of the lens may be in the range $+0.7F$ to $+0.9F$; and the field-flattening element may have a focal length in the range $-0.7F$ to $-3F$ (where F is the focal length of the complete lens).

A prism may be incorporated at an appropriate position in the lens to bend the light path therethrough in well known manner. As will be well understood by those skilled in the art, such a prism can be located at a position of convenience, i.e. in a suitably large air gap in the basic lens design, and the aberrations introduced by this prism can be compensated for without any major significance to the lens configuration. For example, a prism may be interposed between the front and middle parts of the lens, or between the back part and the field-flattening element.

BRIEF DESCRIPTION OF THE DRAWINGS

Embodiments of lens in accordance with the invention will now be described, by way of example, with reference to the accompanying drawings in which.

DESCRIPTION OF THE PREFERRED EMBODIMENTS

Figure 1:
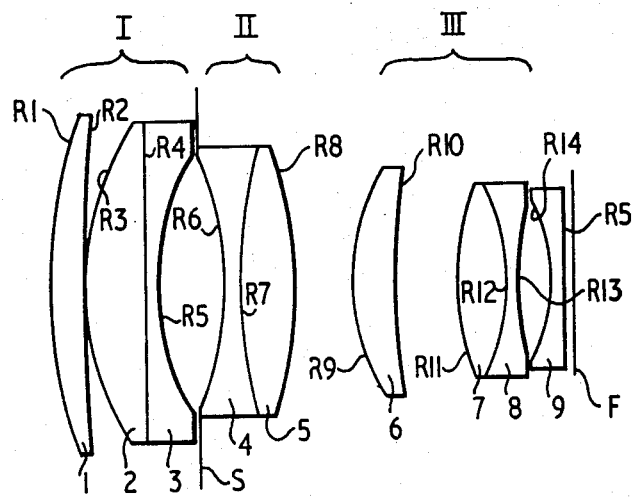
FIG. 1 is a schematic representation of a first embodiment of objective lens.

The embodiment of lens shown in FIG. 1 comprises a front part I of positive power consisting of a front singlet element 1 of positive power which is meniscus convex towards the front, and a doublet of positive power consisting of a front positive convex-plano element 2 cemented to a rear negative plano-concave element 3. The refractive index of the material of the positie element 2 in the doublet is at least as high as that of the negative element 3.

Behind the front part I is a middle part II of negative power consisting of a powerful negative bi-concave element 4 made of a dispersive flint glass type and a positive bi-convex element 5 of weaker power than the element 4 and made of a crown glass type which is less dispersive than the flint glass type of the element 4. In this embodiment the negative element 4 is cemented to the positive element 5 to form a doublet.

Behind the middle part II is a back part III of positive power consisting of a front singlet positive meniscus element 6 convex to the front and a doublet of positive power consisting of a front positive bi-convex element 7 cemented to a rear negative bi-concave element 8.

Behind the back part III is a negative field-flattening element 9 which is concave-plano, concave towards the front.

The lens is disposed in front of an image intensifier tube having a flat input face F. The stop position of the lens is indicated by the reference S.

A particular example of lens in accordance with the embodiment of FIG. 1 has values as in the following table which gives the radii of curvature of the surfaces (identified as R1 to R15), the axial thickness of and spacing between the elements, the refractive index Nd of the elements, and their constringences Vd.

EXAMPLE 1

| Element | Surface | Radius of Curvature | Axial Thickness/ Separation | Refractive Index Nd | Constringence Vd |
|---|---|---|---|---|---|
| 1 | R1 | +186.739 | 12.374 | 1.788309 | 47.39 |
|  | R2 | +730.801 | 0.990 |  |  |
| 2 | R3 | +112.084 | 21.778 | 1.788309 | 47.39 |
| 3 | R4 | PLANO | 6.827 | 1.698951 | 30.07 |
|  | R5 | +103.252 | 24.252 |  |  |
| 4 | R6 | −117.029 | 6.480 | 1.748400 | 27.71 |
| 5 | R7 | +242.508 | 18.808 | 1.788309 | 47.39 |
|  | R8 | −177.686 | 21.782 |  |  |
| 6 | R9 | +72.840 | 17.224 | 1.69734 | 56.19 |
|  | R10 | +377.704 | 22.563 |  |  |
| 7 | R11 | +79.802 | 20.491 | 1.69734 | 56.19 |
| 8 | R12 | −79.802 | 5.400 | 1.698951 | 30.07 |
|  | R13 | +202.900 | 11.047 |  |  |
| 9 | R14 | −66.238 | 4.356 | 1.805182 | 25.43 |
|  | R15 | PLANO | 2.792 |  |  |

Focal length F=100
Aperture F/0.8
Field of View 40 degrees
Barrel Distortion 3.8%
Stop position 13.66 behind R5

Figure 2:
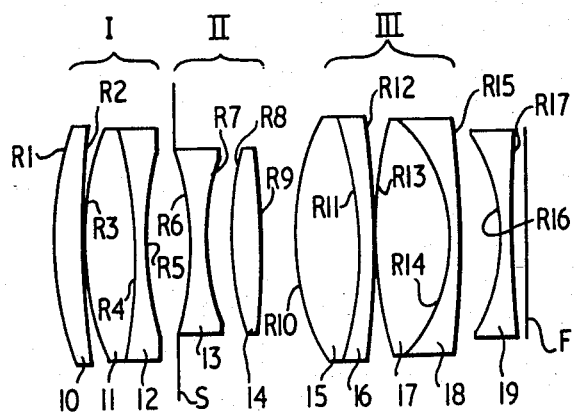
FIG. 2 is a schematic representation of a second embodiment of objective lens.

The embodiment of lens shown in FIG. 2 comprises a front part I of positive power consisting of a front singlet element 10 of positive power which is meniscus convex towards the front, and a doublet of positive power consisting of a front positive bi-convex element 11 cemented to a rear negative bi-concave element 12. The refractive index of the material of the positive element 11 in the doublet is at least as high as that of the negative element 12.

Behind the front part I is a middle part II of negative power consisting of a powerful negative bi-concave element 13 of a dispersive flint glass type and a positive bi-convex element 14 of weaker power than the element 13 and made of a crown glass type which is less dispersive than the flint glass type of the element 13. In this embodiment the elements 13, 14 of the middle part of the lens are not cemented together but are disposed in spaced relationship.

Behind the middle part II is a back part III of positive power consisting of two positive doublets. The front doublet has a front positive bi-convex element 15 cemented to a back negative meniscus element 16 concave towards the front. The back doublet similarly has a front positive bi-convex element 17 cemented to a back negative meniscus element 18 concave towards the front.

Behind the back part III is a negative field-flattening element 19 which is bi-concave.

The lens is disposed in front of an image intensifier tube having a flat input face F. The stop position of the lens is indicated by the reference S.

A particular example of lens in accordance with the embodiment of FIG. 2 has values as given in the following table:

| Element | Surface | Radius of Curvature | Axial Thickness/ Separation | Refractive Index Nd | Constringence Vd |
|---|---|---|---|---|---|
| 10 | R1 | +164.764 | 11.500 | 1.784272 | 41.30 |
|  | R2 | +426.423 | 0.500 |  |  |
| 11 | R3 | +124.141 | 22.440 | 1.788309 | 47.39 |
| 12 | R4 | −238.359 | 5.880 | 1.698951 | 30.07 |
|  | R5 | +215.330 | 16.648 |  |  |
| 13 | R6 | −173.697 | 6.255 | 1.647689 | 33.85 |

-continued

| Element | Surface | Radius of Curvature | Axial Thickness/ Separation | Refractive Index Nd | Constringence Vd |
|---|---|---|---|---|---|
| | R7 | +84.938 | | | |
| | | | 11.559 | | |
| | R8 | +135.873 | | | |
| 14 | | | 13.183 | 1.696800 | 56.18 |
| | R9 | −413.673 | | | |
| | | | 14.164 | | |
| | R10 | +104.714 | | | |
| 15 | | | 28.610 | 1.696800 | 56.18 |
| | R11 | −180.357 | | | |
| 16 | | | 5.004 | 1.584064 | 37.04 |
| | R12 | −582.824 | | | |
| | | | 0.500 | | |
| | R13 | +195.284 | | | |
| 17 | | | 32.537 | 1.696800 | 56.18 |
| | R14 | −70.124 | | | |
| 18 | | | 5.004 | 1.698951 | 30.07 |
| | R15 | −391.939 | | | |
| | | | 17.069 | | |
| | R16 | −77.91 | | | |
| 19 | | | 4.003 | 1.917613 | 21.51 |
| | R17 | +667.205 | | | |
| | | | 3.729 | | |

EXAMPLE 2

Focal length F=100
Aperture F/1.0
Field of View 50 degrees
Barrel Distortion 5.7%
Stop position 12.65 behind R5

Figure 3:
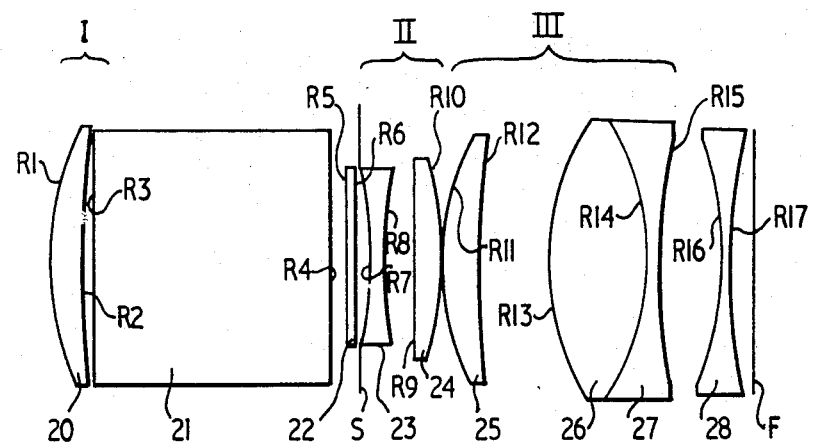
FIG. 3 is a schematic representation of a third embodiment of objective lens.

The embodiment of lens shown in FIG. 3 comprises a front part I of positive power consisting of a single positive element 20 which is meniscus convex towards the front.

Behind the element 20 is an angled prism 21, which bends the light path through the lens in well known manner, and behind the prism 21 is a filter 22 having planar faces.

Behind the filter 22 is a middle part II of negative power consisting of a powerful negative bi-concave element 23 of a dispersive flint glass type and a positive plano-convex element 24, whose planar surface faces towards the front, and which is of weaker power than the element 23 and made of a crown glass type which is less dispersive than the flint glass type of the element 23. The elements 23 and 24 are not cemented together but are disposed in spaced relationship.

Behind the middle part II is a back part III of positive power consisting of a front singlet positive element 25 which is meniscus convex towards the front, and a doublet of positive power consisting of a front positive bi-convex element 26 cemented to a rear negative bi-concave element 27. In this embodiment the singlet element 25 of the back part III is positioned close to the element 24 of the middle part II and, with this arrangement, the barrel distortion introduced by the back part III of the lens is mainly introduced by the front surface of the doublet in the back part, i.e. by the front face of the element 26.

Behind the back part III is a negative field-flattening element 28 which is bi-concave.

The lens is disposed in front of an image intensifier tube having a flat input face F. The stop position of the lens is indicated by the reference S.

A particular example of lens in accordance with the embodiment of FIG. 3 has values as given in the following table:

EXAMPLE 3

| Element | Surface | Radius of Curvature | Axial Thickness/ Separation | Refractive Index Nd | Constringence Vd |
|---|---|---|---|---|---|
| 20 | R1 | +84.656 | | | |
| | | | 8.738 | 1.788309 | 47.39 |
| | R2 | +237.497 | | | |
| | | | 3.280 | | |
| 21 | R3 | PLANO | | | |
| | | | 67.327 | 1.805182 | 25.43 |
| | R4 | PLANO | | | |
| | | | 4.318 | | |
| 22 | R5 | PLANO | | | |
| | | | 2.927 | 1.516800 | 64.17 |
| | R6 | PLANO | | | |
| | | | 4.463 | | |
| 23 | R7 | −106.926 | | | |
| | | | 3.615 | 1.805182 | 25.43 |
| | R8 | +138.238 | | | |
| | | | 8.599 | | |
| 24 | R9 | PLANO | | | |
| | | | 7.201 | 1.689002 | 49.48 |
| | R10 | −103.696 | | | |
| | | | 0.366 | | |
| 25 | R11 | +67.010 | | | |
| | | | 10.787 | 1.620411 | 60.33 |
| | R12 | +304.786 | | | |
| | | | 19.398 | | |
| 26 | R13 | +64.840 | | | |
| | | | 28.629 | 1.620411 | 60.33 |
| | R14 | −64.840 | | | |
| 27 | | | 3.659 | 1.647689 | 33.85 |
| | R15 | +199.056 | | | |
| | | | 17.247 | | |
| 28 | R16 | −99.945 | | | |
| | | | 2.883 | 1.698951 | 30.07 |
| | R17 | +195.763 | | | |
| | | | 4.806* | | |

*For object distance of 32,465

Focal length F=100
Aperture F/1.42
Field of View 50 degrees
Barrel Distortion 21.7%
Stop position 1.56 behind R6

Figure 4:
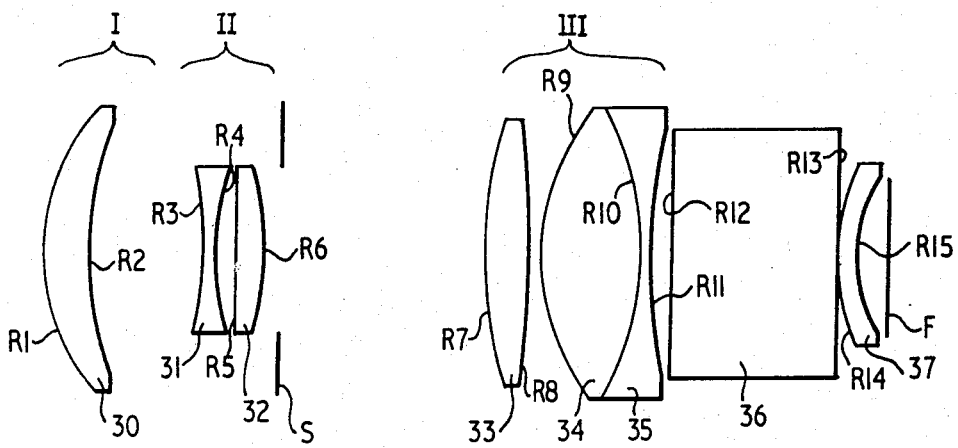
FIG. 4 is a schematic representation of a fourth embodiment of objective lens.

The embodiment of lens shown in FIG. 4 comprises a front part I of positive power consisting of a single positive element 30 which is meniscus convex towards the front.

Behind the front part I is a middle part II of negative power consisting of a powerful negative bi-concave element 31 of a dispersive flint glass type and a positive bi-convex element 32, which is of weaker power than the element 31 and is made of a crown glass type which is less dispersive than the flint glass type of the element 31. The elements 31 and 32 are not cemented together but are disposed in spaced relationship.

Behind the middle part II is a back part III of positive power consisting of a front positive singlet element 33 which is bi-convex and a doublet of positive power consisting of a front positive bi-convex element 34 cemented to a rear negative bi-concave element 35. In this embodiment the back part III of the lens is well spaced from the middle part Ii, the air gap between the elements 32 and 33 being the largest air gap in the lens and being, for example, about three quarters of the focal length of the complete lens. Such large spacing between the middle and back lens parts enables a very high level of barrel distortion to be introduced by causing high incidence angles of the principal ray at the front convex surfaces of the components of the back part.

Behind the back part III is an angled prism 36 which serves to bend the light path through the lens in well known manner.

Behind the prism 36 is a negative field-flattening element 37 which is meniscus convex towards the front.

The lens is disposed in front of an image intensifier tube having a flat input face F. The stop position of the lens is indicated by the reference S.

A particular example of lens in accordance with the embodiment of FIG. 4 has values as given in the following table:

EXAMPLE 4

| Element | Surface | Radius of Curvature | Axial Thickness/ Separation | Refractive Index Nd | Constringence Vd |
|---------|---------|---------------------|-----------------------------|---------------------|------------------|
| 30 | R1 | +70.271 | 14.684 | 1.748400 | 27.71 |
|    | R2 | +116.870 | 37.968 | | |
| 31 | R3 | −133.776 | 5.130 | 1.748400 | 27.71 |
|    | R4 | +106.926 | 5.990 | | |
| 32 | R5 | +1566.026 | 9.584 | 1.517421 | 52.20 |
|    | R6 | −108.898 | 75.260 | | |
| 33 | R7 | +158.527 | 12.472 | 1.788309 | 47.39 |
|    | R8 | −1431.138 | 5.775 | | |
| 34 | R9 | +76.027 | 32.777 | 1.788309 | 47.39 |
|    | R10 | −102.083 | 4.208 | 1.805182 | 25.43 |
| 35 | R11 | +231.409 | 5.990 | | |
|    | R12 | PLANO | 56.891 | 1.805182 | 25.43 |
| 36 | R13 | PLANO | 0.737 | | |
| 37 | R14 | +79.992 | 5.775 | 1.62049 | 36.24 |
|    | R15 | +53.640 | 8.885 | | |

Focal length F=100
Aperture F/1.40
Field of View 40 degrees
Barrel Distortion 25.6%
Stop position 5.5 behind R6

It will be seen that the basic configuration of the designs of all the above described embodiments is that of a triplet type lens, i.e. having a front part I of positive power, a middle part II of negative power, and a back part III of positive power, with the addition of a negative power field-flattening element.

Where a very high aperture is required, the front positive part I consists of a plurality of lens elements, for example three lens elements, and two of these lens elements may be cemented together to form a doublet component as in Examples 1 and 2, the refractive index of the positive lens element in the doublet being at least as high as that of the negative lens element in the doublet, and preferably higher to reduce field (Petzval) curvature and spherochromatism. Where a very high aperture is not required, the front positive part I can consist of a single positive lens element as in Examples 3 and 4.

The middle part II of the lens consists of a powerful negative element made of a dispersive flint glass type and a weaker positive element made of a less dispersive crown glass type. These elements providing the middle part II of the lens may be cemented together as in Example 1 or may be separated as in Examples 2, 3 and 4. The combination of these elements in the middle part of the lens gives a negative group whose effective dispersion is higher than that given by a single negative element of equivalent optical power made of any generally available glass type. This middle negative group also performs its usual functions in a triplet type lens system of correcting the residual spherical aberration of the front and back positive lens groups and also of lowering the residual Petzval sum (field curvature). The power of the middle negative group is, however, generally lower than that encountered in normal triplet type lens designs in order to reduce the aperture-limiting 5th order spherical aberration normally introduced by this group.

The back part III of the lens consists in all embodiments of at least two positive lens components of which at least one is a doublet component in order to correct residual lateral chromatic aberration. In Examples 1, 3 and 4 the back part III consists of a singlet and a doublet whereas in Example 2 the back part III consists of two doublets. The front convex surfaces of the components in the back part III can determine the level of barrel distortion introduced by determining the principal ray incidence angles at these surfaces. Thus, where high levels of barrel distortion are required these components can be shaped to present strongly curved convex surfaces towards the front of the lens, so that, due to the high principal ray incidence angles at these front surfaces, they given strong barrel distortion contributions in conjunction with the normal position of the aperture stop in the vicinity of the middle lens group II. Hence, as illustrated by Examples 1, 3 and 4, at least one of these front convex surfaces may have a radius of curvature less than the focal length of the complete lens. Where extremely high levels of barrel distortion are required such that the shape required of the positive lens components in the back part III is too extreme to enable other aberrations to be well corrected, then the distance between the middle lens group II and the back lens group III can be increased to provide a large air gap between these groups as illustrated by Example 4, thereby correspondingly increasing the principal ray angles of incidence at the front convex surfaces of the back part components.

It will be appreciated that by sharing the introduction of distortion between two surfaces, i.e. the convex front surfaces of the two components of the back part, lower principal ray incidence angles are required at the two surfaces to introduce a given amount of distortion than would be required at a single surface. The off-axis aberration effects are therefore correspondingly reduced since high order aberrations, and specifically fifth order circular coma and fifth order astigmatism, are reduced at a faster rate than primary distortion as the principal ray incidence angle reduces. Further, some vignetting may be employed off-axis to remove the worst effects of any high order aberrations.

In all embodiments the negative field-flattening element behind the back part III reduces the residual (already reasonably low) Petzval sum to an optimum small value.

The power balances between the parts of the lens in the examples set forth above are indicated by the following table which gives for each example the focal length of each part of the lens:

|  | Front Part I | Middle Part II | Back Part III | Field Flattener |
|---|---|---|---|---|
| Example 1 | +2.21F | −7.17F | +0.80F | −0.82F |
| Example 2 | +1.48F | −2.80F | +0.82F | −0.76F |
| Example 3 | +1.63F | −1.82F | +0.76F | −0.95F |
| Example 4 | +2.09F | −1.49F | +0.78F | −2.88F |

The dimensional units in the examples set forth above are millimeters but it will be appreciated that the values are relative and can be scaled accordingly.

I claim:

1. An objective lens which introduces barrel distortion at the edges of its field of view, the lens comprising a front part of positive power consisting of at least one positive lens element, a middle part of negative power consisting of at least two lens elements, one of which is of negative power and of a dispersive material and the other of which is of positive power but less powerful and of a less dispersive material than the negative power element, a back part of positive power and consisting of at least two components of positive power and with front convex surfaces, at least one of the components being a doublet which corrects residual lateral chromatic aberration, and a field-flattening element of negative power, wherein the middle part of negative power corrects residual spherical aberration of the front and back positive parts and lowers the residual Petzval sum which is further reduced by the negative field-flattening element, and wherein the front convex surfaces of the components of the back part of positive power contribute to barrel distortion.

2. A lens according to claim 1 wherein the front part consists of a single positive lens element.

3. A lens according to claim 1 wherein the front part consists of a plurality of lens elements.

4. A lens according to claim 3 wherein the front part includes a doublet having a positive element with a refractive index at least as high as that of a negative element to which it is cemented.

5. A lens according to claim 1 wherein the middle negative part consists of a powerful negative element made of a dispersive flint glass type and a weaker positive element made of a less dispersive crown glass type.

6. A lens according to claim 1 wherein at least one of the front convex surfaces of the components of the back part which contributes to barrel distortion has a radius of curvature less than the focal length of the complete lens.

7. A lens according to claim 1 wherein the air gap between the middle and back parts of the lens is the largest air gap in the lens.

8. A lens according to claim 7 wherein the air gap between the middle and back parts of the lens is about three quarters of the focal length of the complete lens.

9. A lens according to claim 1 wherein the focal length of the front part is in the range +1.4F to +2.3F; the focal length of the middle part is in the range −1.4F to −8F; the focal length of the back part is in the range +0.7F to +0.9F; and the field-flattening element has a focal length in the range −0.7F to −3F (where F is the focal length of the complete lens).

10. A lens according to claim 1 incorporating a prism to bend the light path through the lens.

11. A lens according to claim 10 wherein the prism is interposed between the front and middle parts of the lens.

12. A lens according to claim 10 wherein the prism is interposed between the back part and the field-flattening element.

13. An objective lens which introduces barrel distortion at the edges of its field of view having axially spaced components comprising from front to back in the order given a positive singlet meniscus element convex to the front, a positive doublet comprising a positive convex-plano element cemented to a negative plano-concave element, the refractive index of the positive element in the positive doublet being at least as high as that of the negative element, a negative doublet comprising a negative bi-concave element cemented to a positive bi-convex element, the positive element in the negative doublet being less powerful and of a less dispersive material than the negative element, a further positive singlet meniscus element convex to the front, a further positive doublet comprising a positive bi-convex element cemented to a negative bi-concave element, and a negative singlet concave-plano field flattening element, wherein said negative doublet corrects residual spherical aberration of the positive components of the lens and lowers the residual Petzval sum which is further reduced by said negative field flattening element, said further positive doublet corrects residual lateral chromatic aberration, and the front convex surfaces of said further positive singlet meniscus element and said further positive doublet contribute to barrel distortion.

14. A lens according to claim 13 wherein the refractive indices (Nd) and Abbe numbers (Vd) of the elements, identified as 1 to 9, and the radii of curvature of and spacings between successive surfaces, identified as R1 to R15, are substantially in accordance with the following table:

| Element | Surface | Radius of Curvature | Axial Thickness/ Separation | Refractive Index Nd | Constringence Vd |
|---|---|---|---|---|---|
| 1 | R1 | +186.739 | 2.374 | 1.788309 | 47.39 |
|  | R2 | +730.801 | 0.990 |  |  |
| 2 | R3 | +112.084 | 21.778 | 1.788309 | 47.39 |
|  | R4 | PLANO |  |  |  |
| 3 | R5 | +103.252 | 6.827 | 1.698951 | 30.07 |
|  | R6 | −117.029 | 24.252 |  |  |
| 4 | R7 | +242.508 | 6.480 | 1.748400 | 27.71 |
|  | R8 | −177.686 | 18.808 | 1.788309 | 47.39 |
| 5 |  |  | 21.782 |  |  |
| 6 | R9 | +72.840 | 17.224 | 1.69734 | 56.19 |
|  | R10 | +377.704 | 22.563 |  |  |
| 7 | R11 | +79.802 | 20.491 | 1.69734 | 56.19 |
|  | R12 | −79.802 |  |  |  |
| 8 | R13 | +202.900 | 5.400 | 1.698951 | 30.07 |
|  | R14 | −66.238 | 11.047 |  |  |
| 9 |  |  | 4.356 | 1.805182 | 25.43 |

-continued

| Element | Surface | Radius of Curvature | Axial Thickness/ Separation | Refractive Index Nd | Constringence Vd |
|---|---|---|---|---|---|
| | R15 | PLANO | | | |
| | | | 2.792 | | |

Focal length F=100
Aperture F/0.8
Field of View 40 degrees
Barrel Distortion 3.8%
Stop position 13.66 behind R5.

15. An objective lens which introduces barrel distortion at the edges of its field of view having axially spaced components comprising from front to back in the order given, a positive singlet meniscus element convex to the front, a positive doublet comprising a positive bi-convex element cemented to a negative bi-concave element, the positive element in the positive doublet having a refractive index at least as high as that of the negative element, a negative singlet bi-concave element, a positive singlet bi-convex element which is less powerful and of a less dispersive material than said negative singlet bi-concave element, two positive doublets each comprising a positive bi-convex element cemented to a negative meniscus element concave to the front, and a negative singlet concave-plano field flattening element, wherein said negative singlet bi-concave element and said positive singlet bi-convex element are in combination of negative power and correct residual spherical aberration of the positive components of the lens and lower the residual Petzval sum which is further reduced by said negative field flattening element, said two positive doublets correct residual lateral chromatic aberration, and the front convex surfaces of said two positive doublets contribute to barrel distortion.

16. A lens according to claim 15 wherein the refractive indices (Nd) and Abbe numbers (Vd) of the elements, identified as 10 to 19, and the radii of curvature of and spacings between successive surfaces, identified as R1 to R17, are substantially in accordance with the following table:

| Element | Surface | Radius of Curvature | Axial Thickness/ Separation | Refractive Index Nd | Constringence Vd |
|---|---|---|---|---|---|
| 10 | R1 | +164.764 | | | |
| | | | 11.500 | 1.784272 | 41.30 |
| | R2 | +426.423 | | | |
| | | | 0.500 | | |
| 11 | R3 | +124.141 | | | |
| | | | 22.440 | 1.788309 | 47.39 |
| | R4 | −238.359 | | | |
| 12 | | | 5.880 | 1.698951 | 30.07 |
| | R5 | +215.330 | | | |
| | | | 16.648 | | |
| 13 | R6 | −173.697 | | | |
| | | | 6.255 | 1.647689 | 33.85 |
| | R7 | +84.938 | | | |
| | | | 11.559 | | |
| 14 | R8 | +135.873 | | | |
| | | | 13.183 | 1.696800 | 56.18 |
| | R9 | −413.673 | | | |
| | | | 14.164 | | |
| 15 | R10 | +104.714 | | | |
| | | | 28.610 | 1.696800 | 56.18 |
| | R11 | −180.357 | | | |
| 16 | | | 5.004 | 1.584064 | 37.04 |
| | R12 | −582.824 | | | |

| Element | Surface | Radius of Curvature | Axial Thickness/ Separation | Refractive Index Nd | Constringence Vd |
|---|---|---|---|---|---|
| | | | 0.500 | | |
| | R13 | +195.284 | | | |
| 17 | | | 32.537 | 1.696800 | 56.18 |
| | R14 | −70.124 | | | |
| 18 | | | 5.004 | 1.698951 | 30.07 |
| | R15 | −391.939 | | | |
| | | | 17.069 | | |
| | R16 | −77.911 | | | |
| 19 | | | 4.003 | 1.917613 | 21.51 |
| | R17 | +667.205 | | | |
| | | | 3.729 | | |

Focal length F=100
Aperture F/1.0
Field of View 50 degrees
Barrel Distortion 5.7%
Stop position 12.65 behind R5.

17. An objective lens which introduces barrel distortion at the edges of its field of view having axially spaced components comprising from front to back in the order given, a positive singlet meniscus element convex to the front, a negative singlet bi-concave element, a positive singlet plano-convex element which is less powerful and of a less dispersive material than said negative singlet bi-concave element, a further positive singlet meniscus element convex to the front, a positive doublet comprising a positive bi-convex element cemented to a negative bi-concave element, and a negative singlet bi-concave field-flattening element, wherein said negative singlet bi-concave element and said positive singlet plano-convex element are in combination of negative power and correct residual spherical aberration of the positive components of the lens and lower the residual Petzval sum which is further reduced by said negative field-flattening element, said positive doublet corrects residual lateral chromatic aberration, and the front convex surfaces of said further positive singlet meniscus element and said positive doublet contribute to barrel distortion.

18. A lens according to claim 17 further comprising a prism element and a filter disposed between said positive singlet meniscus element and said negative singlet bi-concave element, wherein the refractive indices (Nd) and Abbe numbers (Vd) of the elements, identified as 20 to 28, and the radii of curvature of and spacings between successive surfaces, identified as R1 to R17, are substantially in accordance with the following table:

| Element | Surface | Radius of Curvature | Axial Thickness/ Separation | Refractive Index Nd | Constringence Vd |
|---|---|---|---|---|---|
| 20 | R1 | +84.656 | | | |
| | | | 8.738 | 1.788309 | 47.39 |
| | R2 | +237.497 | | | |
| | | | 3.280 | | |
| 21 | R3 | PLANO | | | |
| | | | 67.327 | 1.805182 | 25.43 |
| | R4 | PLANO | | | |
| | | | 4.318 | | |
| 22 | R5 | PLANO | | | |
| | | | 2.927 | 1.516800 | 64.17 |
| | R6 | PLANO | | | |
| | | | 4.463 | | |
| | R7 | −106.926 | | | |

-continued

| Element | Surface | Radius of Curvature | Axial Thickness/ Separation | Refractive Index Nd | Constringence Vd |
|---|---|---|---|---|---|
| 23 | | | 3.615 | 1.805182 | 25.43 |
| | R8 | +138.238 | | | |
| | | | 8.599 | | |
| 24 | R9 | PLANO | | | |
| | | | 7.201 | 1.689002 | 49.48 |
| | R10 | −103.696 | | | |
| | | | 0.366 | | |
| | R11 | +67.010 | | | |
| 25 | | | 10.787 | 1.620411 | 60.33 |
| | R12 | +304.786 | | | |
| | | | 19.398 | | |
| | R13 | +64.840 | | | |
| 26 | | | 28.629 | 1.620411 | 60.33 |
| | R14 | −64.840 | | | |
| 27 | | | 3.659 | 1.647689 | 33.85 |
| | R15 | +199.056 | | | |
| | | | 17.247 | | |
| | R16 | −99.945 | | | |
| 28 | | | 2.883 | 1.698951 | 30.07 |
| | R17 | +195.763 | | | |
| | | | 4.806* | | |

*For object distance of 32,465

Focal length F=100
Aperture F/1.42
Field of View 50 degrees
Barrel Distortion 21.7%
Stop position 1.56 behind R6.

19. An objective lens which introduces barrel distortion at the edges of its field of view having axially spaced components comprising from front to back in the order given, a positive singlet meniscus element convex to the front, a negative singlet bi-concave element, a positive singlet bi-convex element which is less powerful and of a less dispersive material than said negative singlet bi-concave element, a further positive singlet bi-convex element, a positive doublet comprising a positive bi-convex element cemented to a negative bi-concave element, and a negative singlet meniscus field-flattening element convex to the front, wherein said negative singlet bi-concave element and said positive singlet bi-convex element are in combination of negative power and correct residual spherical aberration of the positive components of the lens and lower the residual Petzval sum which is further reduced by said negative field-flattening element, said positive doublet corrects residual lateral chromatic aberration, and the front convex surfaces of said further positive singlet bi-convex element and said positive doublet contribute to barrel distortion.

20. A lens according to claim 19 further comprising a prism element disposed between said positive doublet and said field-flattening element, wherein the refractive indices (Nd) and Abbe numbers (Vd) of the elements, identified as 30 to 37, and the radii of curvature of and spacings between successive surfaces, identified as R1 to R15, are substantially in accordance with the following table:

| Element | Surface | Radius of Curvature | Axial Thickness/ Separation | Refractive Index Nd | Constringence Vd |
|---|---|---|---|---|---|
| 30 | R1 | +70.271 | | | |
| | | | 14.684 | 1.748400 | 27.71 |
| | R2 | +116.870 | | | |
| | | | 37.968 | | |
| 31 | R3 | −133.776 | | | |
| | | | 5.130 | 1.748400 | 27.71 |
| | R4 | +106.926 | | | |
| | | | 5.990 | | |
| 32 | R5 | +1566.026 | | | |
| | | | 9.584 | 1.517421 | 52.20 |
| | R6 | −108.898 | | | |
| | | | 75.260 | | |
| 33 | R7 | +158.527 | | | |
| | | | 12.472 | 1.788309 | 47.39 |
| | R8 | −1431.138 | | | |
| | | | 5.775 | | |
| 34 | R9 | +76.027 | | | |
| | | | 32.777 | 1.788309 | 47.39 |
| | R10 | −102.083 | | | |
| 35 | | | 4.208 | 1.805182 | 25.43 |
| | R11 | +231.409 | | | |
| | | | 5.990 | | |
| 36 | R12 | PLANO | | | |
| | | | 56.891 | 1.805182 | 25.43 |
| | R13 | PLANO | | | |
| | | | 0.737 | | |
| | R14 | +79.992 | | | |
| 37 | | | 5.775 | 1.62049 | 36.24 |
| | R15 | +53.640 | | | |
| | | | 8.885 | | |

Focal length=100
Aperture F/1.40
Field of View 40 degrees
Barrel Distortion 25.6%
Stop position 5.5 behind R6.

* * * * *

UNITED STATES PATENT AND TRADEMARK OFFICE
CERTIFICATE OF CORRECTION

PATENT NO. : 4,178,075
DATED : December 11, 1979
INVENTOR(S) : Philip J. Rogers

It is certified that error appears in the above-identified patent and that said Letters Patent are hereby corrected as shown below:

Column 2, line 41, after "be" delete --of--;

line 46, after "range" delete --of--;

Column 4, line 54, please add as a heading --Example 2--;

Column 5, line 22, under the column "Radius of Curvature" delete "77.91" and substitute therefor --77.911--;

line 26, delete the heading --Example 2--;

Column 6, line 64, after "part" delete "Ii" and substitute therefor --II--;

Column 8, line 36, "given" and substitute therefor --give--;

Column 10, line 47, under the column "Axial Thickness/Separation" delete "2.374" and substitute therefor --12.374--.

Signed and Sealed this

Thirty-first Day of March 1981

[SEAL]

Attest:

RENE D. TEGTMEYER

Attesting Officer

Acting Commissioner of Patents and Trademarks